United States Patent [19]

Uchiyama et al.

[11] 4,326,786
[45] Apr. 27, 1982

[54] ELECTROMAGNETICALLY DRIVEN SHUTTER

[75] Inventors: Takashi Uchiyama, Yokohama; Ryoichi Suzuki; Syuichiro Saito, both of Kawasaki; Yoji Sugiura, Yokohama, all of Japan

[73] Assignee: Canon Kabushiki Kaisha, Tokyo, Japan

[21] Appl. No.: 206,990

[22] Filed: Nov. 14, 1980

[30] Foreign Application Priority Data

Nov. 16, 1979 [JP] Japan ................................ 54-148663

[51] Int. Cl.³ .............................................. G03B 9/08
[52] U.S. Cl. ..................................... 354/234; 354/235
[58] Field of Search ................................ 354/234, 235

[56] References Cited

U.S. PATENT DOCUMENTS

| | | | |
|---|---|---|---|
| 2,572,229 | 10/1951 | Willcox | 354/235 |
| 3,593,637 | 7/1971 | Fahlenberg et al. | 354/235 |
| 3,604,330 | 9/1971 | Fahlenberg et al. | 354/235 |
| 3,784,291 | 1/1974 | Hirata et al. | 354/235 |
| 4,171,897 | 10/1979 | Fujita et al. | 354/235 |

Primary Examiner—Russell E. Adams
Attorney, Agent, or Firm—Toren, McGeady & Stanger

[57] ABSTRACT

In a slit exposure shutter having leading and trailing blades driven to run down to make an exposure and to return to their initial positions by an electromagnetic drive source, this source is provided with electromagnetically operated latch means for holding the leading and trailing blades in either one of the terminal ends of running down and returning movement thereof. Another feature is that the above-described latch means is constructed by utilizing the magnetic attraction force of at least one of the stationary and movable electromagnetic members of the drive source.

28 Claims, 24 Drawing Figures

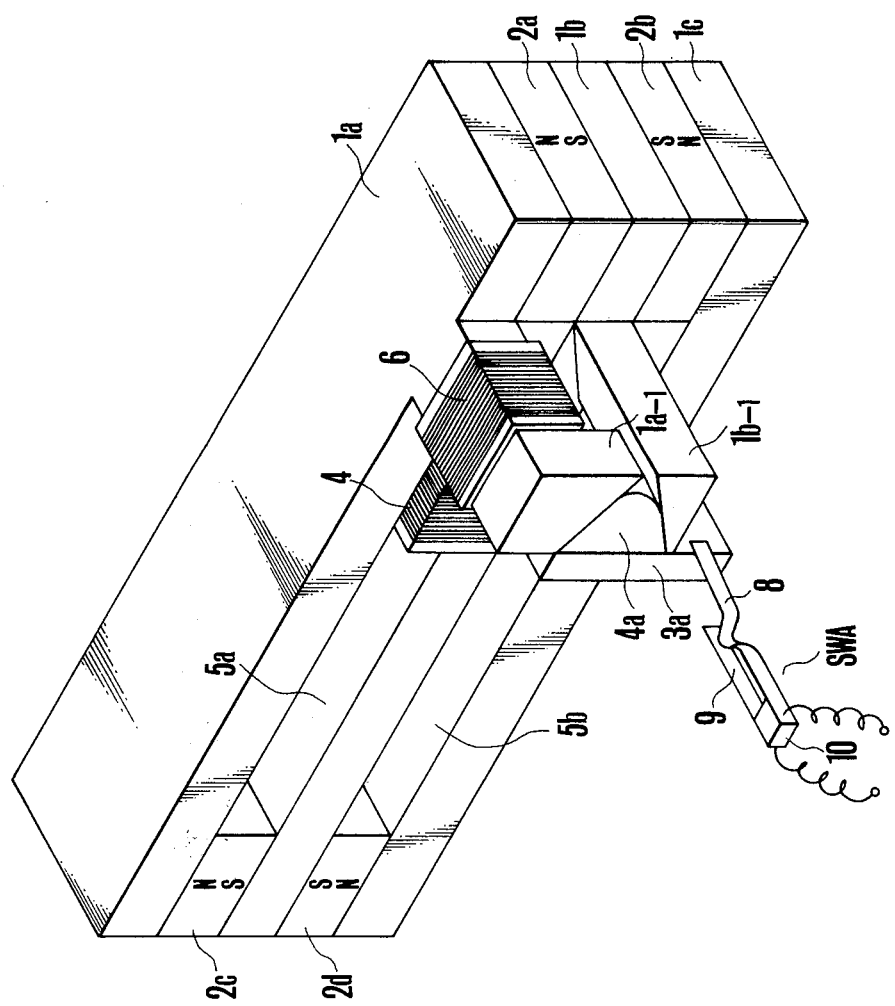

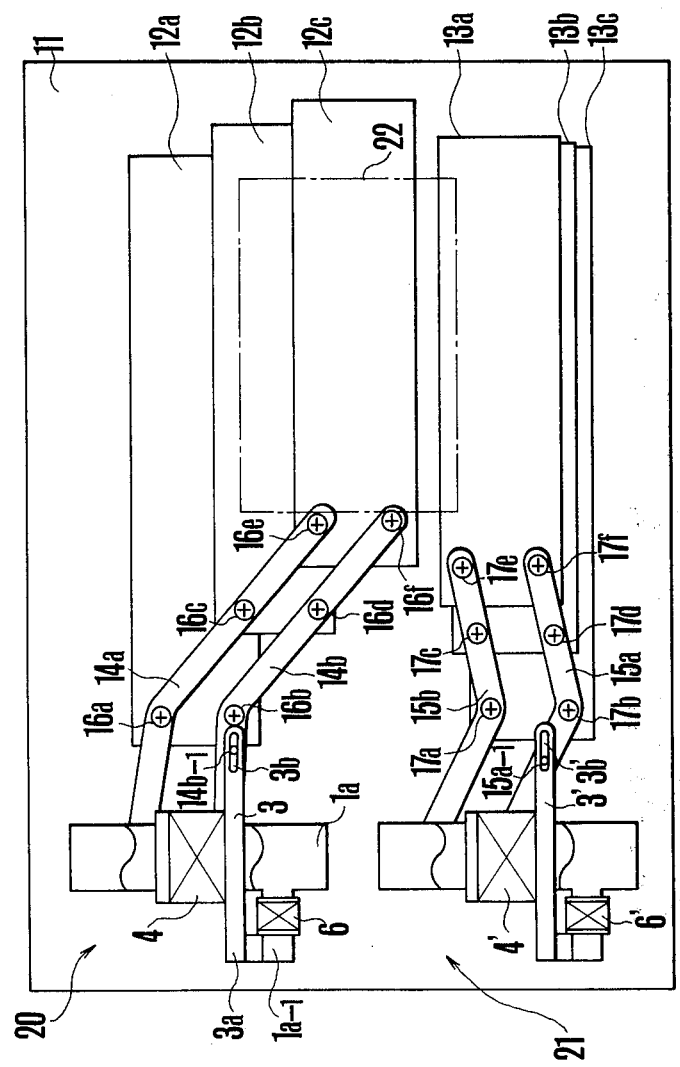

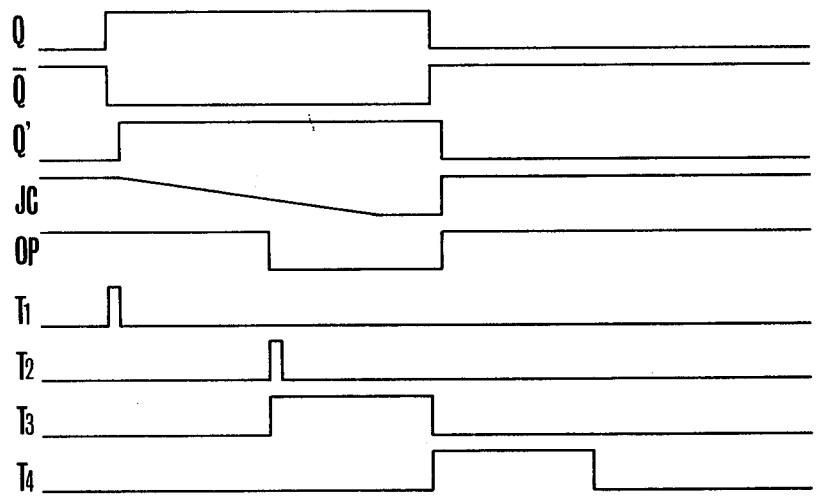

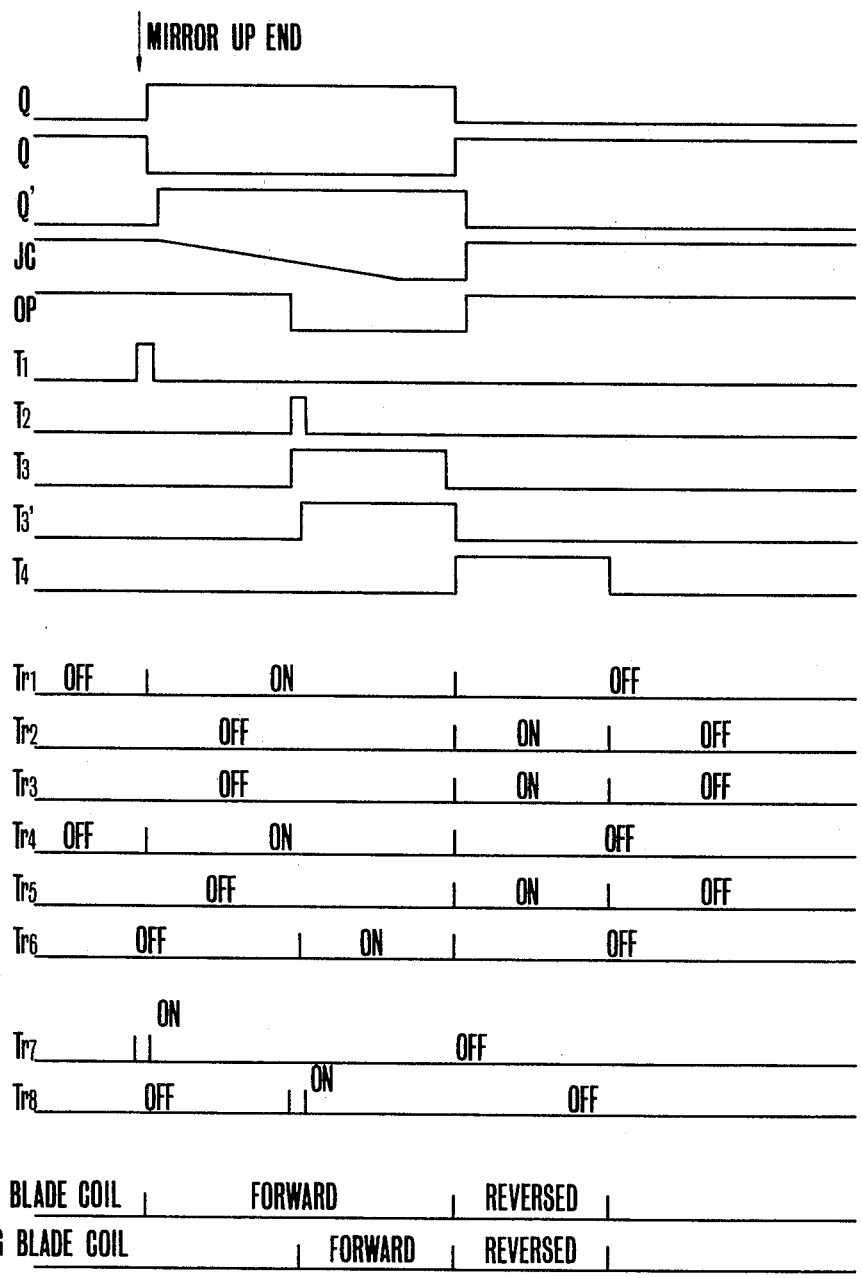

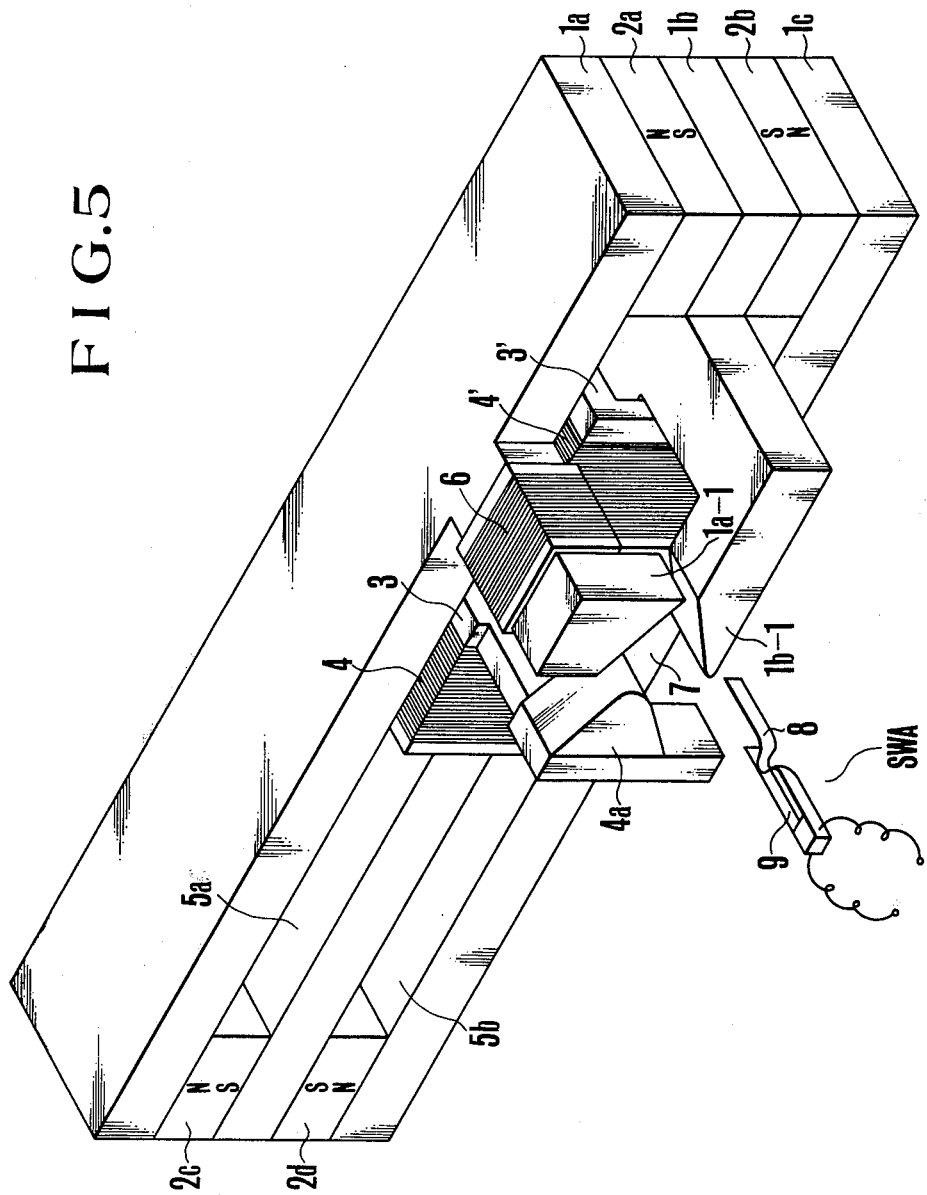

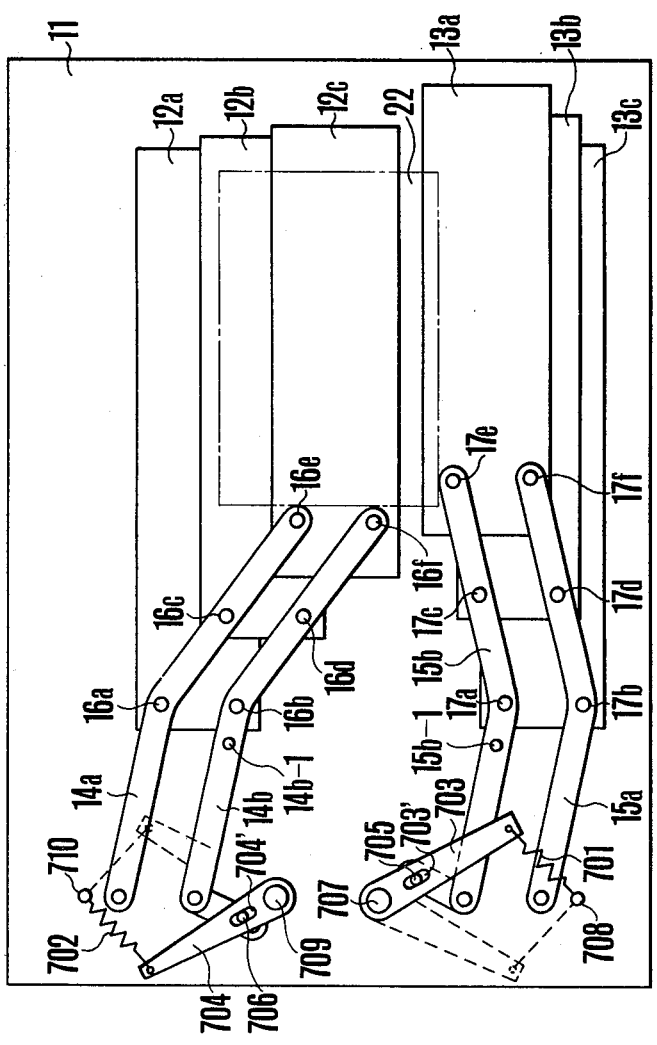

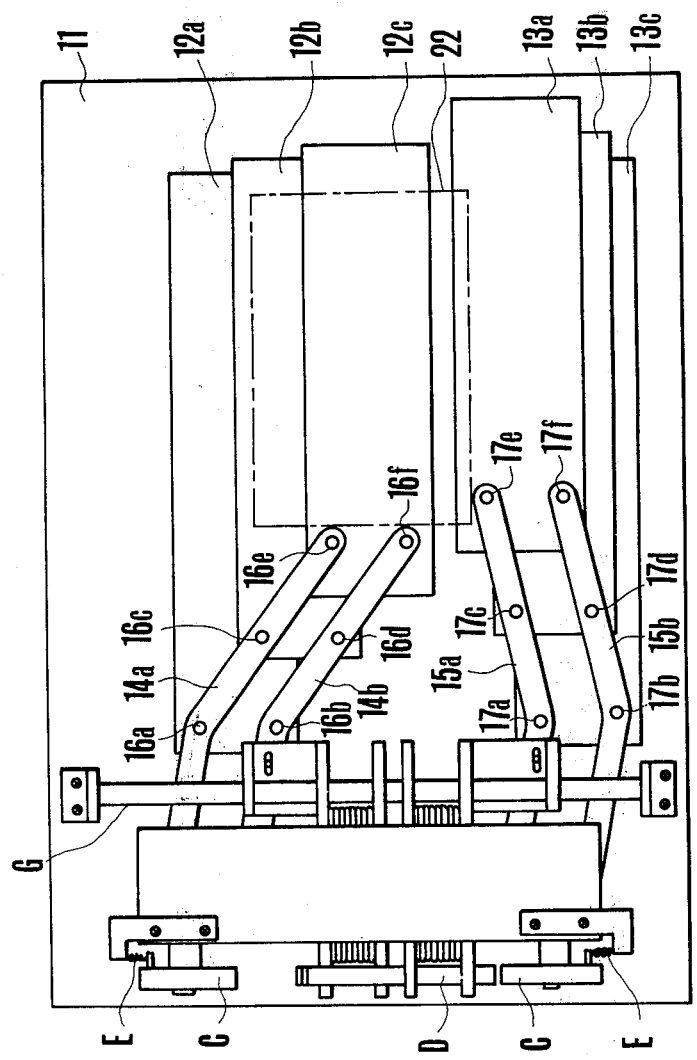

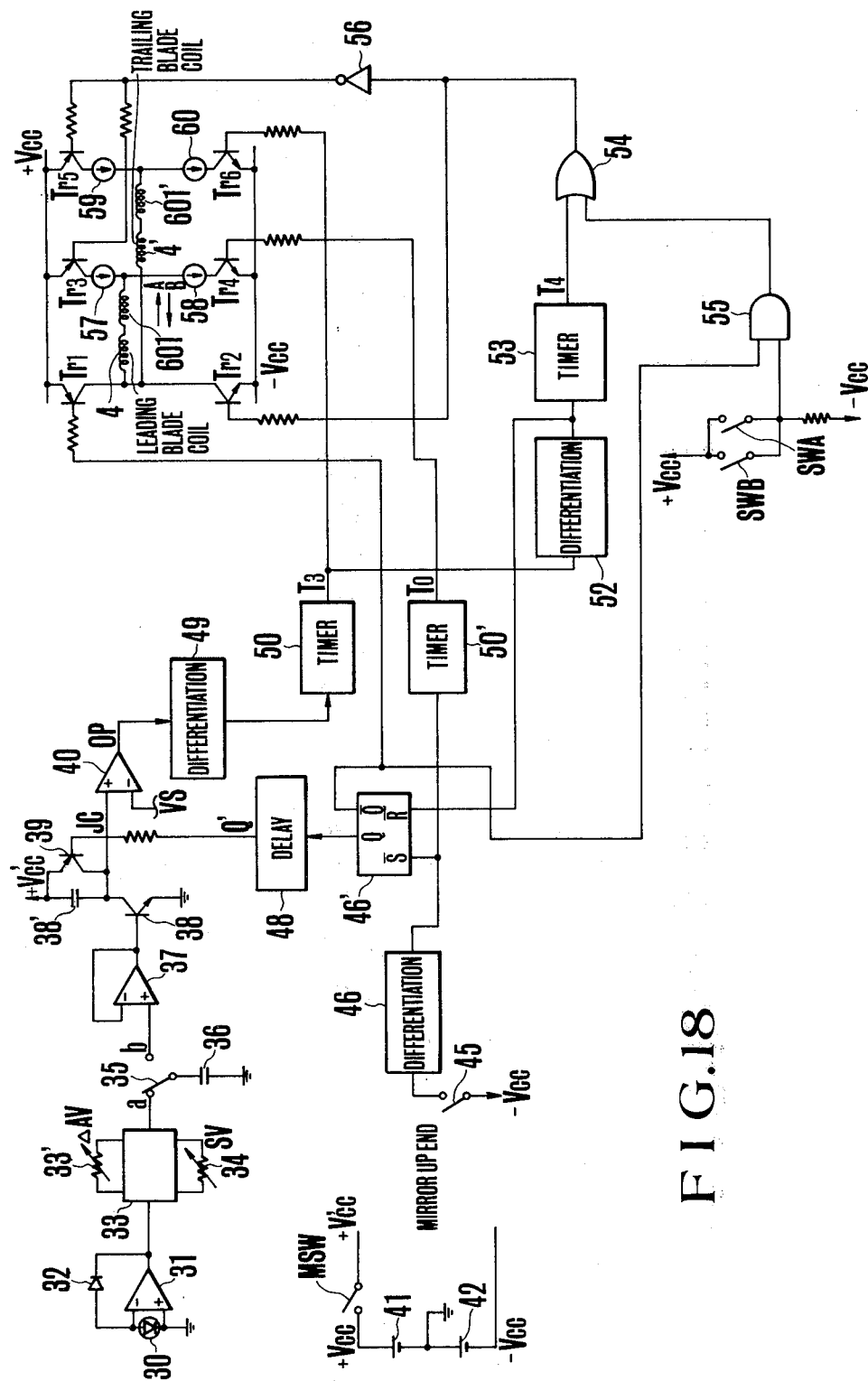
F I G. 18

ELECTROMAGNETICALLY DRIVEN SHUTTER

BACKGROUND OF THE INVENTION

This invention relates to electromagnetically operated shutters for cameras, and more particularly to improvements of such shutter.

It is known to provide for a camera with a shutter for the drive source of which relies upon a mechanical power or tensioned spring. That is, the spring charged at the time of film winding up is once locked, and when to actuate a shutter release, this lock is released, causing the shutter to be driven to move.

In such spring-powered shutter, it is natural to provide a lock member of the character described above so that the once charged spring as the drive source is prevented from releasing the power before the shutter release is actuated.

For the shutter device utilizing an electromagnetic force as the drive power, however, it is substantially unnecessary to have what is called the lock member since the shutter blades will not be positively driven to move unless supplied with current. The lack of the lock member, however, leads to give rise to a problem that since the shutter when freed from the electromagnetic drive force is retained in the stationary closed position merely under the action of frictional force between the shutter blades, when acceleration is effected due to the gravity, vibrations, or shock, the shutter blades are caused to split off, thereby the film is accidentally exposed. Particularly with the camera often handled in severe working conditions, there is a high possibility of occurrence of such accident. If so, the problem becomes very serious.

It should be also pointed out that the constant energization of the electromagnetic drive source as a counter measure for such problem will lead to a great disadvantage in actual practice.

SUMMARY OF THE INVENTION

An object of the present invention is to provide an electronically operated magnetic control device capable of stabilizing the drive control of a slit exposure shutter while still being constructed in an extremely simple form as the use of a shutter charge mechanism or the like is not necessary at all.

Another object of the invention is to provide an electromagnetic control device with the further inclusion of means for preventing the accidental movement of the shutter blades during the time except when the shutter is being actuated to release.

Still another object of the invention is to provide an electromagnetic control device with the furthermore inclusion of means having, despite an extremely simple structure, to realize the latching control of the shutter blades.

According to an embodiment of the present invention, the shutter is made held stationary in the open or closed position by utilizing at least one element of the electromagnetic control device comprised of permanent magnets, yokes and magnetic windings. Thus, an electromagnetically driven shutter, though its being of extremely simple structure, having a high practical performance can be obtained. It is also possible that even when shock is given to the shutter blades, the shutter is hardly caused to open accidentally.

BRIEF DESCRIPTION OF THE DRAWINGS

FIG. 2 is a plan view of an example of a slit exposure shutter associated with the electromagnetic control device of FIG. 1.

FIG. 3(b) is a pulse timing chart showing a manner in which the circuit of FIG. 3(a) may operate.

FIGS. 4(a) and 4(b) show another example of the circuitry and the manner of operation.

FIG. 5 is a perspective view of another embodiment of an electronically operated magnetic control device according to the present invention.

FIG. 8 is a plan view of the shutter blades of FIG. 7 with addition of spring-powered accelerating and braking means.

FIG. 9(d) is a plan view of an example of a slit exposure shutter employing the device of FIGS. 9(a) to 9(c).

FIG. 18 is an electrical circuit diagram, partly in block form, of a drive control circuit for the device of FIG. 17.

DESCRIPTION OF THE PREFERRED EMBODIMENTS

The present invention will next be described in greater detail in connection of the embodiments thereof by reference to the drawings.

Figure 1A:
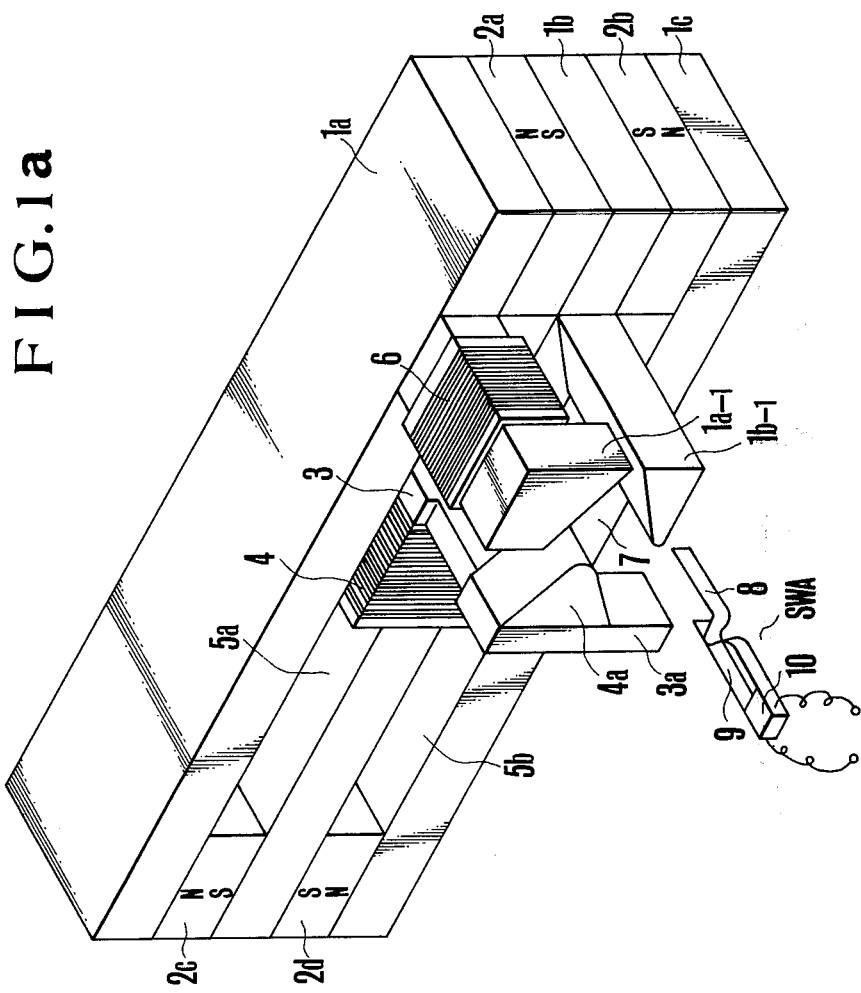
FIG. 1 is perspective views of an embodiment of an electronically operated magnetic control device for a shutter according to the present invention with FIG. 1(a) showing a latch means in a position just before the shutter blades are held, and FIG. 1(b) showing the latch means in an effective position for latching the shutter blades.

In FIGS. 1 to 3 there is shown a first embodiment of the invention. The electronically operated magnetic control device of FIG. 1(a) is adapted for use in moving one of the leading and trailing shutter blades. In the figure, members 1a, 1b and 1c are yokes; 2a to 2d are flat permanent magnet pieces of rare earth element oriented as shown in the figure and positioned in sandwiched relation between the above-described yokes as shown in the figure. Magnetic flux formed in magnetic gaps 5a and 5b between the yokes 1a and 1b and between the yokes 1b and 1c respectively are directed normally downwardly for the gap 5a and normally upwardly for the gap 5b by the magnetomotive force of permanent magnets 2a to 2d. It is noted that these electromagnetic members are fixedly secured to the frame-work of a camera (not shown).

A ring-like coil-turning frame bobbin 3 is freely fitted on the above-described yoke 1b, a coil 4 being turned on said bobbin 3. When a current supply to said coil 4 starts, the interaction between the current flowing therethrough and the magnetic flux formed in the gaps 5a and 5b drives the bobbin 3 to the left or right. The bobbin 3 is operatively connected to shutter blades (not shown). 3a is a projected portion of the bobbin 3. Fixed to said projected portion 3a is a high magnetic permeability member of triangular cross section 4a. Member 1a-1 is a projected portion of the yoke 1a on which is wound said projected portion there is turned a coil 6. Member 1b-1 is a projected portion of the yoke 1b. The projected portion 1b-1 forms a magnetic gap 7 together with the projected portion 1a-1. In said magnetic gap 7 there is produced a magnetic flux due to the magnetomotive force of the permanent magnets 2a and 2c, so that when the bobbin 3 nears the right terminal end of movement thereof, the high magnetic permeability member 4a is attracted by the magnetic flux in the gap 7 and sticks fast to the projected portions 1a-1 and 1b-1 of the yokes. If the position of the bobbin 3 at this time is adjusted to correspond to the closed position of the shutter, the shutter can be latched stationary in the closed position by the magnetic adhesion force of the high magnetic permeability member 4a, and projected portions 1a-1 and 1b-1 of yokes.

By the way, as shown in FIG. 1(b), when the member 4a is in contact with the projected portions 1a-1 and 1b-1 of yokes, the magnetic resistance of the gap 7 is substantially reduced, a large proportion of the magnetic flux produced from the permanent magnets 2a and 2c is allowed to flow through the projected portions 1a-1 and 1b-1 of yokes, and therefore the magnetic flux produced in the gap 5a is suddenly reduced. But, since in the shutter closed position, the leftward or rightward force on the bobbin 3 to drive movement of the shutter blades is not necessary, such sudden decrease of the magnetic flux in the gap 5a does not give rise to a practical problem. To release the shutter, for example, in the case of a single lens reflex camera, the completion of upward movement of the quick return mirror is arranged to be followed immediately by the start of current supply to the magnetic coil 6. A magnetomotive force is generated in the same direction as the permanent magnets 2a and 2c to cancel the magnetic flux due to the permanent magnets 2a and 2c. Hence, the magnetic flux flowing between the projected portions of yokes 1a-1 and 1b-1 is reduced to zero. In this state, the attractive force of the projected portions 1a-1 and 1b-1 of yokes to the high magnetic permeability member 4a diminishes. Further since the current supply to the coil 6 causes the magnetic flux of the permanent magnets 2a and 2c to flow through the gap 5a, as the gap 5b is intrinsically given a magnetic flux, when the coil 4 is supplied with current, the bobbin 3 is readily freed to move to the left without suffering from any biased force while driving the shutter blades to run down simultaneously.

A switch SWA for detecting when the shutter is opened comprising contacts 8 and 9 and an insulator member 10. When in the shutter closed position, as shown in FIG. 1(b), the contact 8 is bent by the projected portion 3a of the bobbin, thus opening the switch SWA. When the shutter is slightly opened, as shown in FIG. 1(a), the switch SWA is brought into closed. The aim of provision of the switch SWA is that when a shock is applied to move the high magnetic permeability member 4a away from the yokes 1a-1 and 1b-1 and the shutter tends to open, this is sensed by the switch SWA and the coil 4 is immediately supplied with current so as to effect a returning movement of the bobbin 3 to the closed position. By the virtue of the switch SWA, therefore, it is made possible to prevent the faulty operation of the shutter resulting from the shock when in the shutter closed position.

FIG. 2 shows an example of application of the electromagnetic control device of the invention to a slit exposure shutter, the shutter being in an early stage of the opening movement. In the figure, 11 is a base plate; 12a–12c are leading blades of the shutter; 14a and 14b are arms for driving the leading blades of the shutter, the left ends of which are pivotally mounted at respective pins (not shown). Again, said arms each are operatively connected to the leading blades 12a to 12c of the shutter through pivot pins 16a to 16f. 15a and 15b are arms for driving trailing blades 13a to 13c of the shutter as are operatively connected thereto through pivot pins 17a to 17f.

The electromagnetic control device 20 of FIG. 1, is coupled to the leading blades of the shutter. An electromagnetic control device 21 of similar construction is coupled to the trailing blades of the shutter. Openings 3b and 3b' are elongated slots provided in the respective bobbins 3 and 3', in which are engaged pins 14b-1 and 15a-1 normally standing on the leading and trailing blade drive arms 14b and 15a respectively. By this engagement, the linear motion of the bobbins 3 and 3' in vertical directions as viewed in the figure are converted to opening and closing movements of each of the leading and trailing blades of the shutter. 22 is a shutter opening. The position of FIG. 2 indicates that the shutter is running.

Figure 3A:
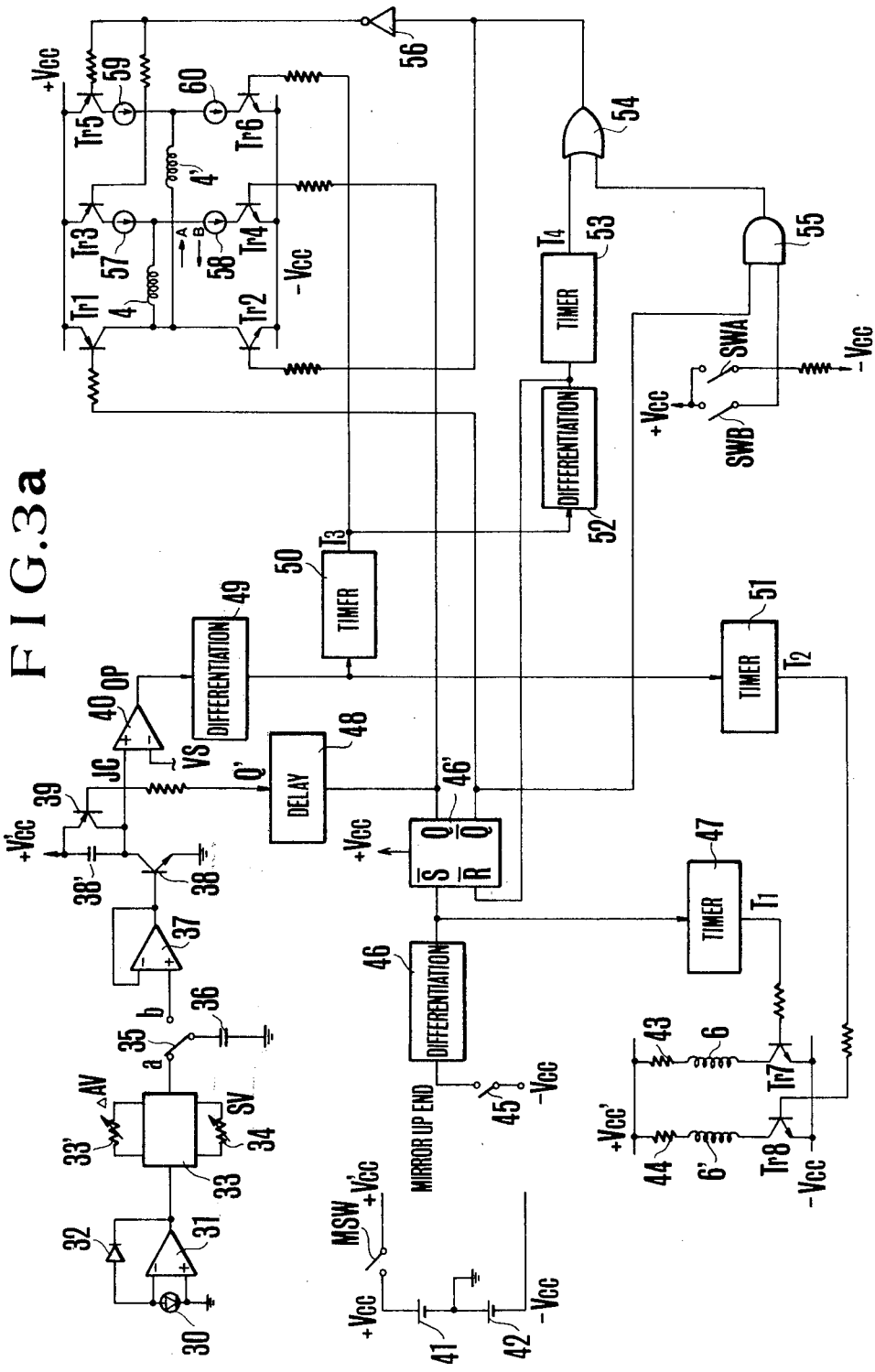
FIG. 3(a) is an electrical circuit diagram, partly in block form, of an example of the circuitry of the electromagnetic control device of FIG. 1.

A drive circuit of the electromagnetic drive device (linear motor) used in the above embodiment is shown in FIG. 3(a). This circuit is adapted for use with the circuitry of a TTL open metering type diaphragm preselection automatic exposure single lens reflex camera.

In the figure, element 30 is a photo-voltaic cell (for example, SPC) positioned to receive light entering through an objective lens (not shown); 31 is an operational amplifier (hereinafter abbreviated to OP amp.) constituting an SPC head amplifier having two input terminals across which is connected the above-described SPC 30 with a diode 32 connected in the negative feedback path thereof. Element 33 is a known computer circuit; 33' is a variable resistor for setting an aperture information representative of the number of stops to be closed down ($\Delta$Av); 34 is a variable resistor for setting an ASA sensitivity information of the used film (Sv), the output of the computer 33 representing a shutter time step number information (Tv); 36 is a condenser for memorizing said Tv information; 35 is a changeover switch normally set in "a" position and arranged upon start of an upward movement of the quick return mirror to be moved to "b" position. Circuit 37 is an OP amp. forming a voltage follower; 38 is a transistor for logarithmic elongation with its collector connected to a timing condenser 38'. 39 is a switching transistor for count start; 40 is an OP amp. constituting a comparator circuit with its non-inverting input connected to the collector terminal of the logarithmic elongation transistor 38 and with its inverting input feed with a reference voltage Vs. Element 49 is a differentiation circuit connected to the output of the comparator circuit 40; 50 is a timer circuit triggered by a negative pulse from the differentiation circuit 49 to hold its output at high level for a predetermined time (for example, 20 msec.). Element 52 is a differentiation circuit connected to the output of the timer circuit 50. Member 45 is a normally open switch arranged upon completion of the upward movement of the quick return mirror to be closed, the closure of said switch causing a differentiation circuit 46 in the next stage to produce a negative pulse. Circuit 47 is a timer circuit connected to the output of the differentiation circuit 46 and triggered by the negative pulse from the differentiation circuit 46 to hold its output at high level for a short time (for example, 2 msec.). Circuit 46' is an RS flip-flop circuit with its set input connected to the output of the differentiation circuit 46 and with its Q output terminal connected to a delay circuit 48. The output Q' of said delay circuit 48 is connected through a resistor to the base of the count start switching transistor 39. 53 is a timer circuit connected to the output of the differentiation circuit 52 and triggered by a negative pulse from said differentiation circuit 52 to hold its output at high level for a predetermined time (for example, 20 msec.).

Block 51 is a timer circuit connected to the output of the differentiation circuit 49 and triggered by a negative pulse from said differentiation circuit 49 to hold its output at high level for a short time (for example, 2 msec.).

Circuit 55 is a two-input AND gate with its one input connected to the $\bar{Q}$ output of the RS flip-flop circuit 46', and with its other input connected to the positive terminal Vcc of an electrical power source or battery through the above-described accidental shutter opening detecting switches SWA (for the leading blades) and SWB (for the trailing blades) connected in parallel with each other.

Element 41 and 42 are series-connected batteries with their junction point connected to ground. MSW is a main switch of the camera. Here let us denote the battery terminal on the load side of said switch by +Vcc', and the both terminals of the battery string by +Vcc and −Vcc respectively.

Elements Tr7 and Tr8 are switching transistors for driving the magnetic windings 6 and 6' with their bases connected through respective resistors to the outputs of the above-described timer circuits 47 and 51 respectively, and with their collectors connected to one ends of the above-described coils 6 and 6', the opposite ends of which are connected to current limiting resistors 43 and 44 respectively.

54 is a two-input OR gate with its one input connected to the output T4 of the above-described timer circuit 53 and with its other input connected to the output of the above-described AND gate 55. 56 is an inverter circuit connected to the output of said OR gate 54.

Transistors Tr1 to Tr6 for the drive of the electromagnetic coils 4 and 4' take such a bridge structure as shown in the figure. 4 is the shutter leading blade drive coil shown in FIG. 2, and 4' is the shutter trailing blade drive coil. The coil 4 is connected between the collector of the switching transistor Tr1(Tr2) and the collector of the Tr3(Tr4). Again, the coil 4' is connected between the collector of the switching transistor Tr1(Tr2) and the collector of the switching transistor Tr5(Tr6). In the figure, arrow A indicates the direction in which current flows when the shutter runs down, and arrow B indicates the direction in which current flows when the shutter is reset. The base of the switching transistor Tr1 is connected to the $\bar{Q}$ output of the above-described RS flip-flop circuit 46, the base of the Tr2 to the output of the above-described OR gate 54, the bases of Tr3 and Tr5 to the output of the above-described inverter circuit 56, the base of Tr4 to the Q output of the above-described RS flip-flop circuit 46', and the base of Tr6 to the output T3 of the above-described timer circuit 50, all through respective resistors.

Circuits 57 to 60 are constant current circuits connected to the respective collector terminals of the above-described switching transistors Tr3 to Tr6, so that the leading and trailing blade drive coils 4 and 4' are fed with constant current flowing in either a forward or reversed direction. Further, the output currents of the constant current circuits 58 and 60 are made equal to each other so that when the shutter is running down, the speeds of the leading and trailing blades become equal to each other.

The operation described above may best be understood from reference to FIG. 3(a) and the pulse timing chart of FIG. 3(b).

The SPC head amplifier 31 produces an output in the form of a voltage dependent upon the object brightness Bv and the F-number of the objective lens at full open aperture, and said output voltage is computed by the next stage computer circuit 33 with the preset diaphragm stop number information Av and the used film sensitivity (ASA) information Sv, a voltage corresponding to the effective shutter speed information Tv appearing at the output of the computer circuit 33. This voltage is applied to and memorized in the condenser 36.

Then, when a shutter release is actuated, the quick return mirror starts to move upward by means (not shown), thereby the above-described change-over switch 35 is moved to "b" position. Therefore, the voltage stored on the above-described memory condenser 36 appears at the output of the OP amp. 37. On the other hand, when the upward movement of the quick return mirror is completed, the above-described switch 45 is closed, causing the differentiation circuit 46 to produce a negative pulse. This pulse is applied to trigger the timer circuit 47 with the change of its output to high level. This output of high level continues for the short time during which the switching transistor Tr7 is conducting to permit current supply to the coil 6 shown in FIG. 2. Therefore, as has been mentioned in connection with FIG. 1, the magnetic field of the projected portions 1a-1 and 1b-1 of the yoke 1a is cancelled out, and the attractive force of the said projected portions 1a-1 and 1b-1 to the high magnetic permeability member 4 disappears. The negative pulse from the differentiation circuit 46 also causes the RS flip-flop circuit 46' to be set with the change of its Q output to high level and of its $\bar{Q}$ output to low level. Therefore, the switching transistors Tr1 and Tr4 are turned on so that a constant current requlated by the circuit 58 flows in a direction of arrow A to the leading blade drive coil 4. Thus, the bobbin 3 of FIG. 1 starts to move to the left, while driving the shutter leading blades to run down.

In a slight delay from the time of change of the output Q of the above-described flip-flop circuit 46' to H level, (this is intended to compensate for the time gap from the start of running down movement of the leading blades to the start of an exposure of the film), the output Q' of the delay circuit 48 is changed to H level, thereby the above-described count start switching transistor 39 is turned off. Then, the timing condenser 38' is charged by the current of intensity equal to the logarithmically elongated conversion of the output voltage of the above-described OP amp. 37, while its terminal level voltage JC is being lowered as shown in FIG. 3(b). When this voltage JC reaches the inverting input voltage Vs of the OP amp. 40 constituting the comparator circuit, said OP amp. 40 changes its output OP to L level, causing the next stage differentiation circuit 49 to produce a negative pulse which is then applied to trigger the next stage timer 51 with the change of its output T2 to H level. This output T2 remains at H level for the short time (for example, 2 msec.). Such change of the output T2 of the timer 51 causes the switching transistor Tr8 to be turned onto supply current to the coil 6' shown in FIG. 2. As has been mentioned above, therefore, the attractive force on the bobbin 4' disappears. The negative pulse from the differentiation circuit 49 triggers the timer 50 also with the change of the output T3 to H level. This continues for a predetermined time (for example, 20 msec.). Such change of the output T3 of this timer to H level causes the switching transistor Tr6 to be turned on. Since the switching transistor Tr1 has been conducting as mentioned above, the coil 4' for the trailing blades of the shutter is fed with a constant current of intensity regulated by the constant current circuit 60 flowing in the direction indicated by arrow A. Further since the latching force on the bobbin 3' is no longer present, the trailing blades of the shutter start to run down. It should be pointed out that the time for which the output T3 of the timer 50 is maintained at high level is previously adjusted to a value slightly longer than the time necessary to complete the running movement of the trailing blades to insure that the shutter entirely closes the exposure aperture.

When the output T3 of the timer 50 returns to L level, the next stage differentiation circuit 52 produces a negative pulse which is then applied to reset the above-described RS flip-flop circuit 46' with the change of its Q and $\overline{Q}$ outputs to L and H levels respectively. Such change of the output T3 of the timer 50 to L level also causes the switching transistors Tr1, Tr4 and Tr6 to be turned off.

Again the negative pulse from the above-described differentiation circuit 52 triggers the next stage timer circuit 53. Then, the output T4 of the timer 53 is maintained at H level for the predetermined time (for example, 20 msec.) during which the output of the next stage OR gate 54 takes H level, and the output of the inverter circuit 56 takes L level. During this time, therefore, the switching transistors Tr2, Tr3 and Tr5 are conducting, causing the leading and trailing blade drive coils 4 and 4' to be supplied with the constant currents from the circuits 57 and 59. Thus, the leading and trailing blades start to move to their initial positions. It should be pointed out that the time for which the output T4 of the above-described timer circuit 53 takes H level is previously adjusted to a value slightly longer than the time necessary to reset the leading and trailing blades to insure that they can reach the initial positions.

As has been described above, this circuit makes easy the running movement of the bobbins by applying a pulse of short duration to each of the coils 6 and 6' at the time of start of a running of the shutter on the coil 4 for driving the leading blades of the shutter and the coil 4' for driving the trailing blades of the shutter to extinguish the adhesive force between the yoke and bobbin, while simultaneously supplying current to the coils 4 and 4' on the bobbins. Further, in this circuit, even after the leading blades of the shutter have run down, the current supply to the coil 4 is made to continue until resetting operation starts, thus preventing the leading blades from being returned by a shock or the like.

Next explanation is given to the function of preventing accidental movement of the shutter when in the closed position.

In the case of the leading blades, by reference to FIG. 1(b), if something like shock occurs resulting in the disengagement of the high magnetic permeability member 4a from the projected portions 1a-1 and 1b-1 of yokes followed by the leftward movement of the bobbin 3, the projected portion 3a of the bobbin 3 is taken out of engagement with the contact 8 of the switch SWA. Thus, the switch SWA is closed as shown in FIG. 1(a). Then, the AND gate 55 of FIG. 3(a) changes its output to H level since its one input is changed to H level, and the $\overline{Q}$ output of the RS flip-flop circuit 46' is of H level except when the shutter is released. Then, the OR gate 54 changes its output to H level and the inverter circuit 56 changes its output to L level. Therefore, the switching transistors Tr2, Tr3 and Tr5 are turned on, causing current flow through the leading blade coil 4 and the trailing blade coil 4' in a resetting direction (B direction) and therefore causing the bobbin 3 to be driven to move to the right. Thus, the high magnetic permeability member 4a is again brought into contact with the projected portions 1a-1 and 1b-1 of the yokes and the shutter is retracted to the closed position.

In the case of the trailing blades, the switch SWB is acted on and a similar process to the above proceeds. By the way, though the running of the leading and trailing blades of the shutter leads to close the above-described switches SWA and SWB, it is not necessary at this time to feed the coils 4 and 4' with the reversed current flow. For this reason, the above-described RS flip-flop circuit 46' is allowed to produce a $\overline{Q}$ output of L level during the time when the shutter is running down. Therefore, the output of the AND gate 55 takes H level independently of whether the switches SWA and SWB are open or closed, thereby the coils 4 and 4' are freed from the supply of the reversed current flow.

Figure 4A:
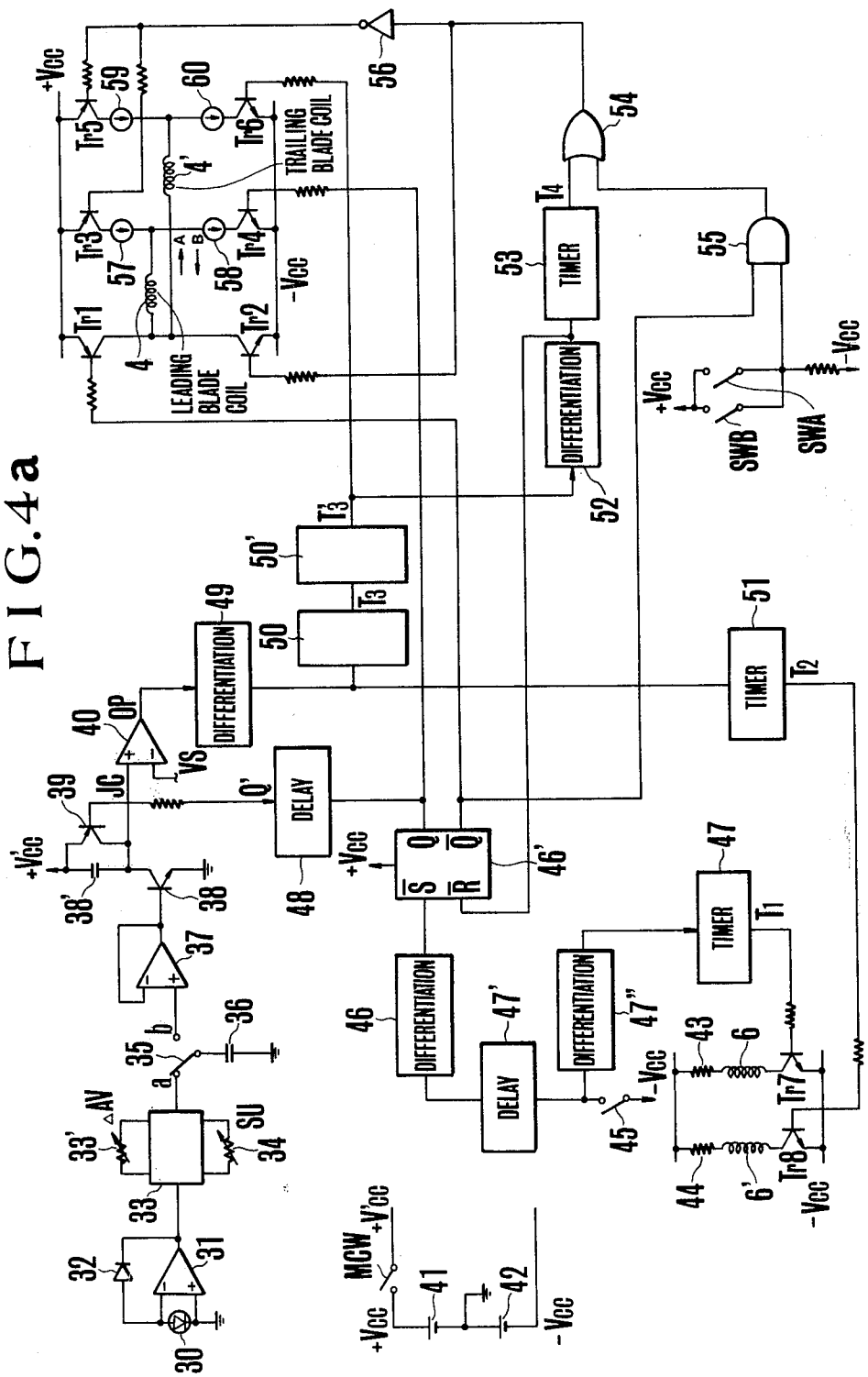

FIG. 4(a) shows a circuit as is improved over the circuit of FIG. 3(a). Whilst the circuit of FIG. 3(a) operates in such a manner that the current supplies to the coil 6(or 6') and the shutter blade drive coil 4(or 4') simultaneously start, the circuit of FIG. 4(a) delays the start of current supply to the shutter blade drive coil 4 (or 4') by some time from the start of the current supply to the coil 6 (or 6') with the advantage that after the residual magnetic flux in the gap 7 has thoroughly disappeared, the bobbin 3 starts to run down, thus achieving a more reliable and more accurate control of the shutter operation.

In FIG. 4(a) where the same reference characters have been employed to denote the similar parts of those shown in FIG. 3(a), and therefore these parts are no more explained. 50 is a timer circuit and 50' is delay circuit connected to the output thereof. Again, 47' is a delay circuit; and 47'' is a differentiation circuit. This circuit operates in a manner shown by the pulse timing chart of FIG. 4(b). This manner is fundamentally the same as the circuit of FIG. 3, and no more explanation is given here.

FIG. 5 shows a second embodiment of the electromagnetic drive device according to the present invention.

Whilst the first embodiment of FIG. 1 employs two shutter latch mechanisms for the respective leading and trailing blades of the shutter independently of each other, the embodiment of FIG. 4 employs only one latch mechanism for the leading blades of the shutter and its holding power is utilized in latching even the trailing blades of the shutter, thus reducing the complexity of structure.

In the figure, the parts denoted by the same reference numerals are similar to those shown in FIG. 1, and no more explanation is given thereto. In this embodiment, the bobbin 3' for the trailing blades of the shutter is freely fitted on the common yoke 1b of the bobbin 3 for the leading blades. Since said bobbin 3' is arranged on the right side of the bobbin 3, when the high magnetic permeability member 4a fixedly mounted on the bobbin 3 magnetically sticks on the projected portions 1a-1 and 1b-1 of yokes, the magnetic attraction holds not only the leading blades in the aperture closed position, but also inhibits the trailing blade carrying bobbin 3' from leftward movement, and at the same time holds the trailing blades in the initial or aperture open position, when the shutter is in the closed position.

Figure 6A:
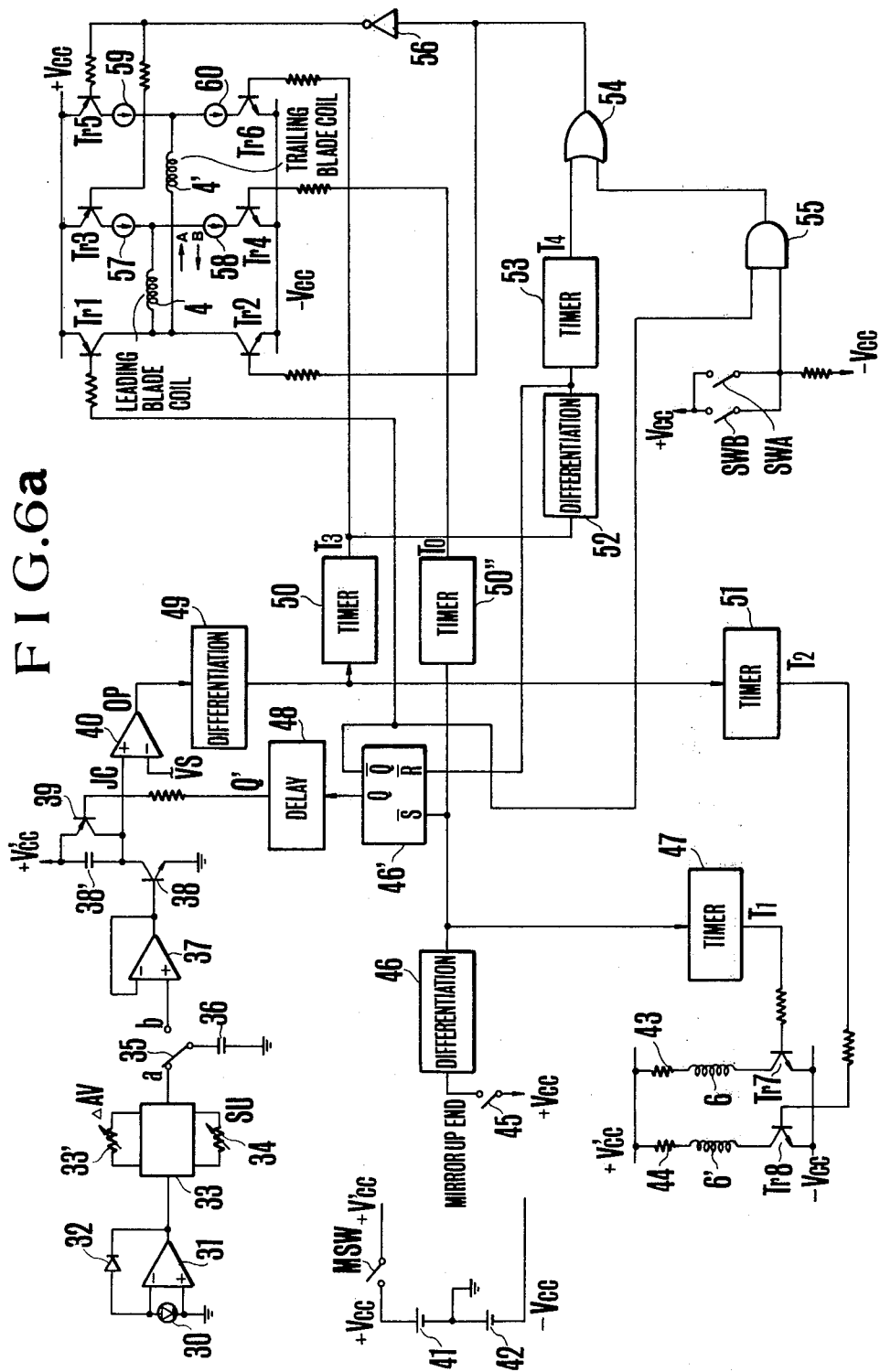
FIGS. 6(a) and 6(b) show still another example of the circuitry of the device of FIG. 1 and a manner in which the circuit may operate respectively.

FIG. 6(a) shows an another example of modification of the drive control circuit of FIG. 1 with the further inclusion of means for latching the leading blades of the shutter in the run down position (not shown).

The use of the latch means at the terminal end of running down movement the leading blades makes it unnecessary to continue the current supply to the coil 4 after that terminal end is reached. Therefore, the period of energization of the coil 4 for the drive of the leading blades is limited to a minimum necessary for the leading blades to travel the full length of running path by the output To of the timer circuit 50''.

Since the circuit of FIG. 6(a) is almost similar to that of FIG. 3(a), explanation is given to the different points.

The output of the differentiation circuit 46 is connected to the set input terminal of the RS flip-flop circuit 46' and also to the trigger input terminal of a timer circuit 50''. Responsive to the negative pulse from the differentiation circuit 46, the timer 50'' is triggered with the change of its output to H level. Then, the output of H level is maintained unchanged for a predetermined time (for example, 20 msec.). Another feature is that the base of the current supply control switching transistor Tr4 for the leading blades of the shutter is connected to the output To of the above-described timer circuit 50'' through a resistor.

Figure 6B:
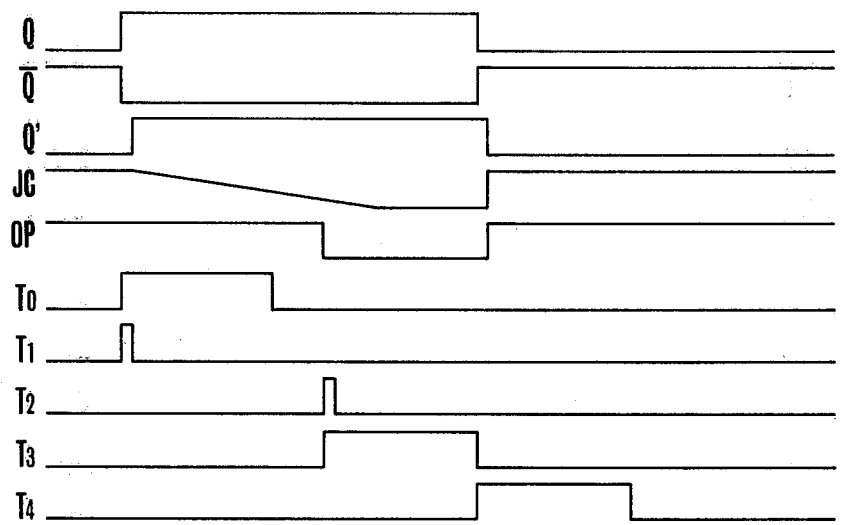

FIG. 6(b) shows a timing chart for the operation of the circuit of FIG. 6(a). As is evident from these drawings, the switching transistor Tr4 is turned on only when the output To of the timer circuit 50''' is of H level, so that after the leading blades of the shutter have run down, the current supply to the coil 4 is cut off until the start of the resetting operation, thus saying the consumption of electrical energy.

A third embodiment of the present invention will next be described reference to FIGS. 7 to 12. Whilst the first and second embodiments are to latch the shutter blades by the electromagnetic force, the third embodiment as will be described in greater detail below employs a lock pawl as the latch means in combination with an electromagnetic actuator therefor in order to improve the reliability of the latching control.

Figure 7:
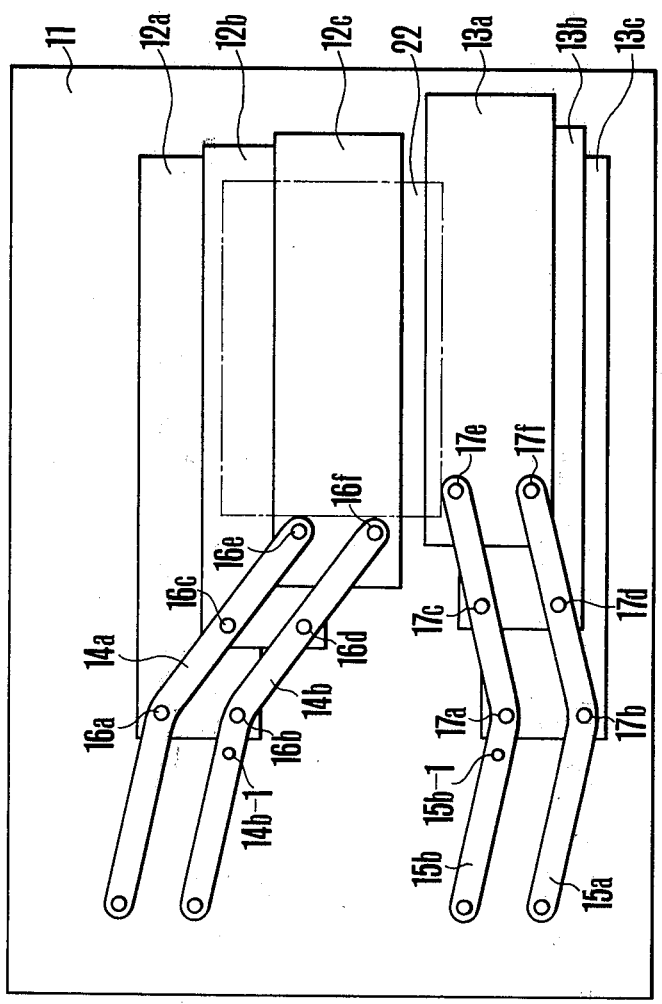
FIG. 7 is a plan view of the shutter blades of a slit exposure shutter driven by the third embodiment of the electromagnetic control device of the invention.

FIG. 7 is an elevational view showing the construction of a slit exposure shutter suited for application of the third embodiment of the invention. The illustrated position is assumed on the way to initiate an exposure. It is noted in connection of the figure that the same reference numerals have been employed to denote the similar parts to those shown in FIGS. 1 and 2. The leading and trailing blades and drive arms therefor are symmetrically configured to each other to achieve a stabilization of the operation and to make it easy to hold the shutter blades in either of the initial and terminal ends of movement thereof.

FIG. 8 shows a shutter blade mechanism as is partly improved over that of FIG. 7 by the use of springs having two functions of acceleration and braking. That is, the leading and trailing blades of the shutter each are supplemented by a spring, the arrangement being such that when the front border of the blades comes to lie at the center of the length of a running path thereof, a balanced state takes place, and that near the start of a running down or resetting movement, a positive driving force is given, and near the termination of the movement, a braking force is given. This improves the ramp at the time of start of the movement of the blades, and achieves a smooth speed reduction when the blades are stopped. It is needless to say that the accelerating and braking actions of the spring of FIG. 8 are applicable not only to the third embodiment as shown in FIG. 8, but also to the above-described first and second embodiments and all the other embodiments of the invention. That is, the addition of the accelerating and braking forces by the spring of FIG. 8 is effective when applied to the so-called vertical running slit shutter comprising a plurality of blades provided with latch means.

In FIG. 8, 701 and 702 are springs having the accelerating and braking functions described above with their one ends affixed to respective pins 708 and 710 on the base plate 11, and their other ends connected to levers 703 and 704 at one ends thereof. The levers 703 and 704 are pivotally mounted on axles 707 and 709 respectively, and have elongated slots 703' and 704' in which are engaged pins 705 and 706 planted on the arms 15b and 14b for the trailing and leading blades of the shutter respectively. By the construction and arrangement illustrated, the springs 701 and 702 operate in such a manner that when the leading and trailing blades lie at the center of the area of the aperture 22, a minimum length is taken and a balancing is attained. When the leading and trailing blades assume the initial positions (illustrated positions), the springs 701 and 702 both apply the accelerating forces through the levers 703 and 704 and arms 15 and 14 to the blades. Conversely when the blades approach the terminal ends of movement thereof, a braking force is exerted.

Figure 9A:
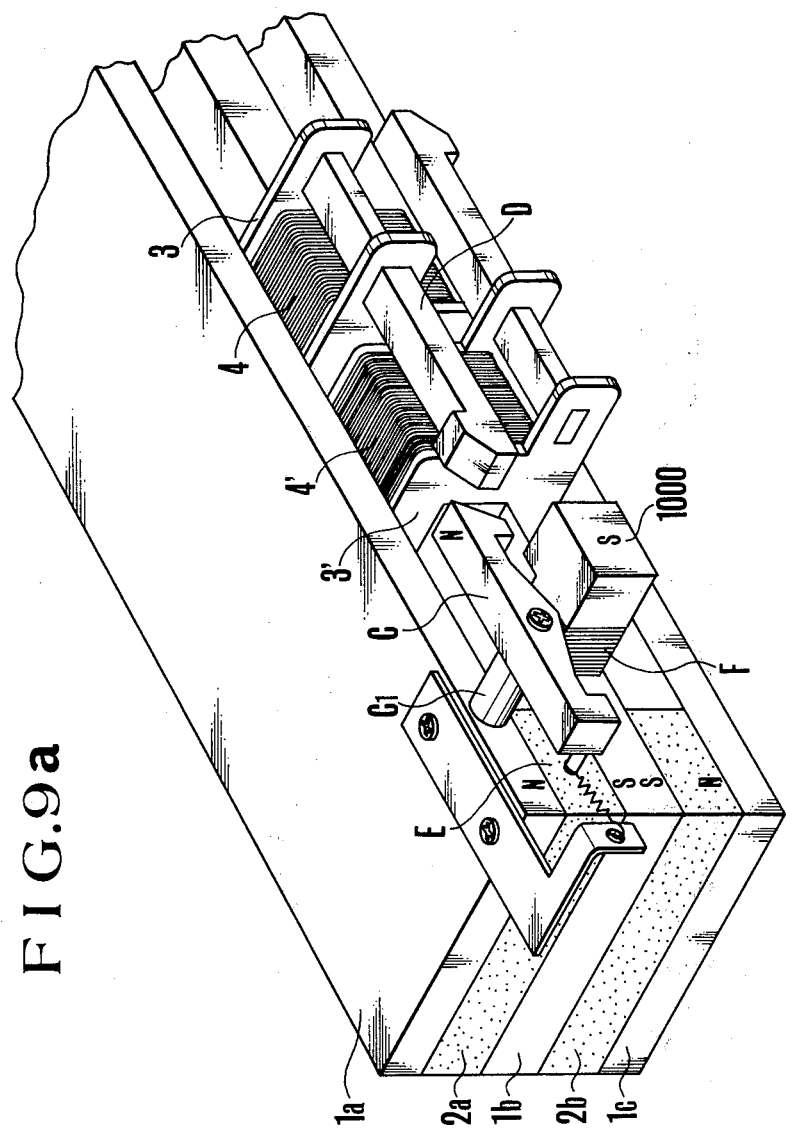
FIG. 9(a) is a fragmentary perspective view of a third embodiment of the electronically operated magnetic control device according to the present invention as is provided with a lock pawl and a hook.
Figure 9B:
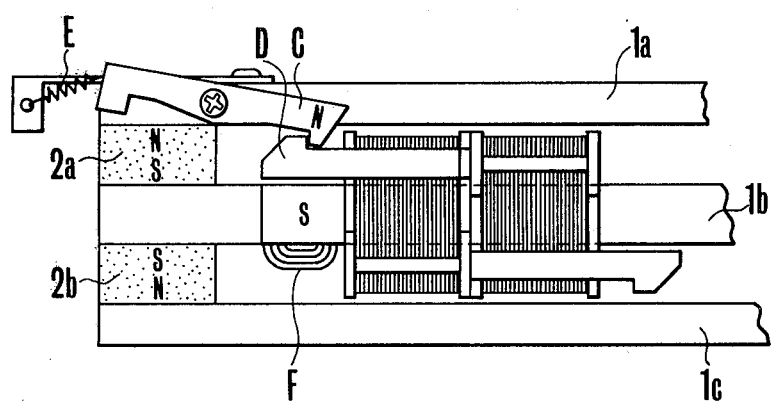
FIGS. 9(b) and 9(c) are respectively plan and side views of the main parts of the device of FIG. 9(a).
Figure 9C:
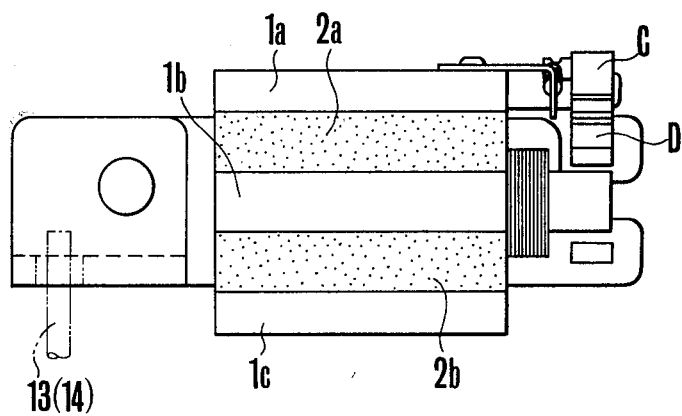

FIGS. 9(a) to 9(d) show one embodiment of an electromagnetic drive device according to the present invention suited for use with the shutter of FIG. 8. FIG. 9(a) is a perspective view of the drive portion, FIG. 9(b)

a side elevational view of the same portion, FIG. 9(c) a similar view looking from the back side, and FIG. 9(d) a plan view of a slit exposure shutter provided with the drive portion of FIGS. 9(a) to (c). In the figures, the same reference characters have been employed to denote the similar parts to those shown in FIGS. 1 and 4. As shown in FIG. 9(a), in this embodiment, likewise as in FIG. 5, the leading blade drive coil 4 and the trailing blade drive coil 4' are arranged on a common yoke 16 one after the other. C is a latching lock pawl, and this lock pawl C forms a magnetic circuit together with the yokes 1a and 1b and a magnet 2a, the attractive force of the lock pawl C and yoke 1000 being balanced with the tension of a spring E at a point of position illustrated. As the coil is supplied with drive current and a magnetic permeability member D fixedly mounted on the coil bobbin 3 is moved to the left as viewed in the figure, when its pawled end portion approaches the lock pawl C, the lock pawl C is automatically turned. Then, the end of the member D is engaged with the lock pawl C. Thus, the shutter is latched.

When to reset, a coil F is supplied with current, thereby the magnetic field of the permanent magnet of the lock pawl C is cancelled out. Then, the lock pawl C is disengaged from the pawled end portion of the member D by the recovering force of the spring E. This is followed by the current supply to the coils 4 and 4', and the leading and trailing blade drive members 3 and 3' starts to move to the right as viewed in the figure. Thus, the shutter is reset. FIG. 9d is an elevational view of an example of a slit exposure shutter constructed by the use of the electromagnetic drive device of FIGS. 9(a) to 9(c). In the figure, G is a guide member stabilizing the operation of the above-described drive coils as they move, thereby the friction is reduced and the vertical vibrations are prevented from occurring. It is noted that though the illustrated device is provided with two latch mechanisms each comprising the members C, E and D, one of them may be omitted, as this one only functions to catch the shutter for a while from the termination of the running down movement to the start of returning movement.

Figure 10:
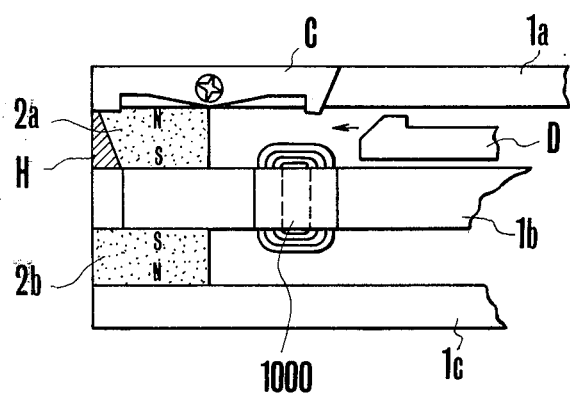
FIGS. 10 and 11 are fragmentary plan views of other two examples of the latch means of the electromagnetic control device of the invention.

The spring E may be omitted as shown in FIG. 10, where there is instead provided a pole piece H on the end portion of the yoke 1b in alignment with one end of the pawl C, thereby a balance of the lock pawl C is taken by using the thus formed magnetic force in attracting the lock pawl C. The lock pawl C is magnetized to N pole by the yoke 1a, and this attracts the S pole of the pole piece H, while the other end is attracted by the yoke 1000, so that a balance is held in the illustrated position. When the front end of the drive coil member D nears the front end of the pawl C, an attractive force is exerted in between the both, thereby the lock pawl C is turned against the attractive force due to the magnetic field, finally latching the member D. The other part of operation is similar to that shown in connection with FIG. 8.

Figure 11:
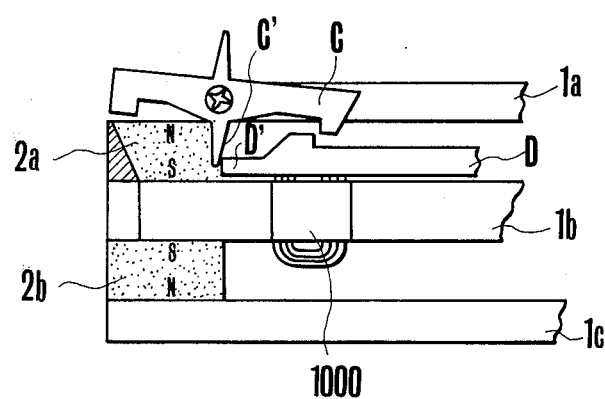

FIG. 11 shows an example of modification of the device of FIG. 10 with the provision of a bound preventing mechanism rendered operative when to latch. A projection C' of the lock pawl C and a front projection D' of the coil drive member engage with each other when to lock, thereby a locking is automatically established as the pawl C is pushed in a clockwise direction. Thus, a bounding at the time of locking the device in the embodiment of FIGS. 9 and 10 can be prevented.

Figure 12:
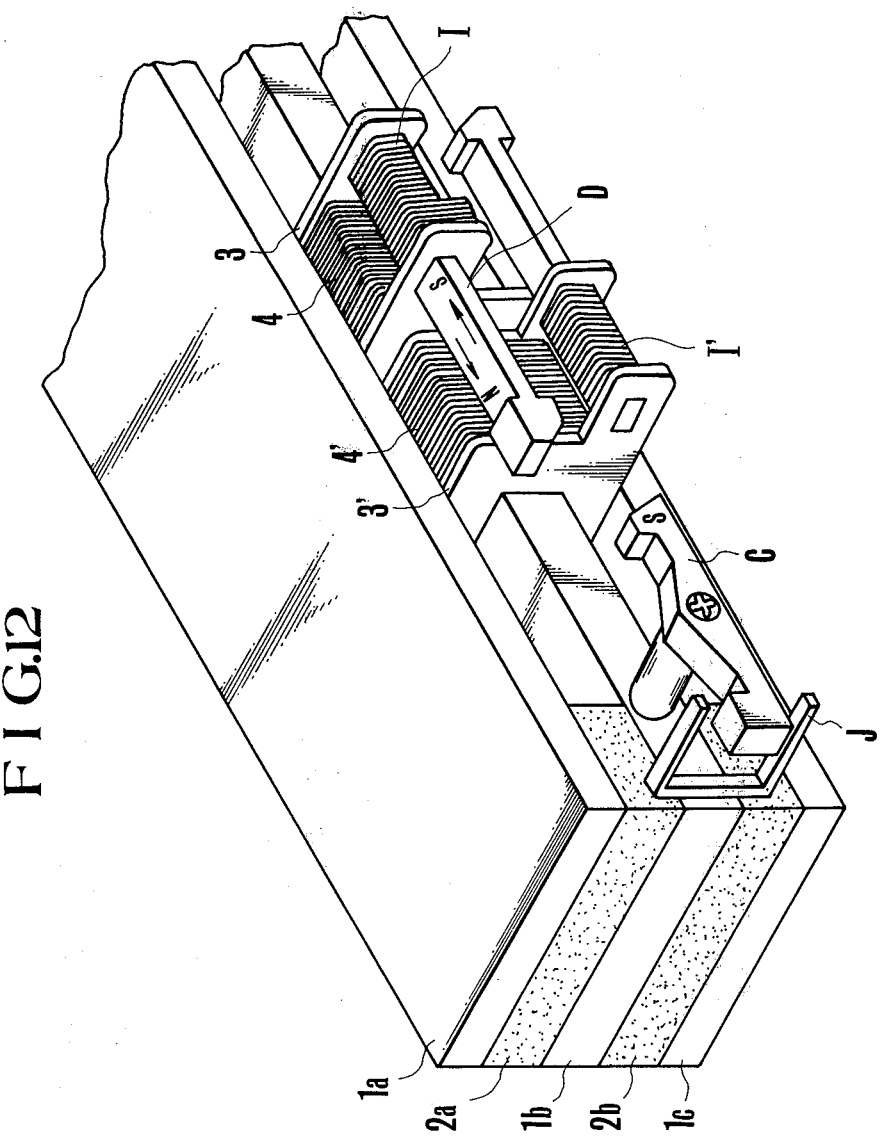
FIG. 12 is a fragmentary perspective view of a fourth embodiment of the electromagnetic control device according to the present invention.
Figure 13:
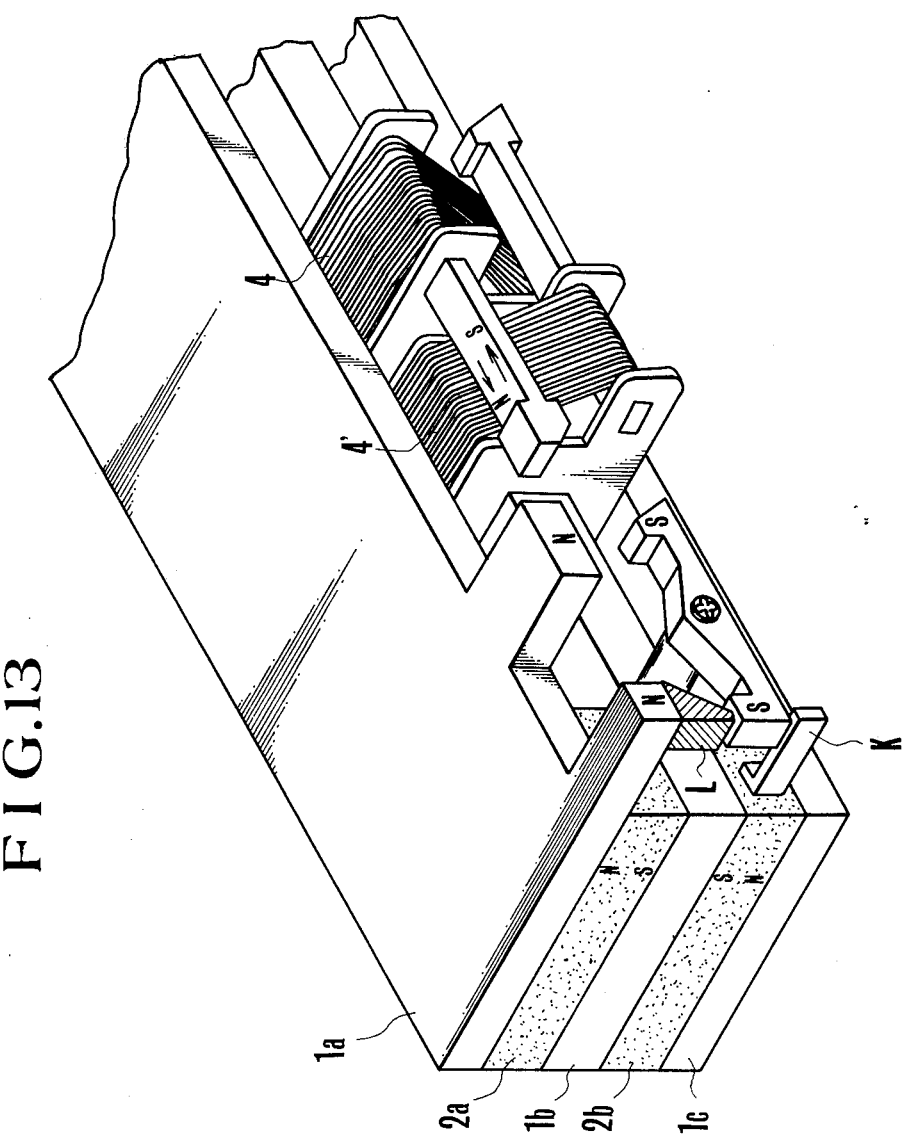
FIG. 13 is similar view showing an example of modification of the device of FIG. 12.

FIGS. 12 and 13 are perspective views of a fourth embodiment of the electromagnetic drive device according to the present invention. In this embodiment, the release coil provided on the lock pawl C side is removed and instead the lock pawl portion on the drive coil side is provided with a coil to produce a braking effect when to lock and a releasing effect. In the device of FIG. 12, the member D is provided with a coil I arranged upon current supply thereto to be magnetized to N pole at the end thereof as the member moves to the left. Since the front end of the lock pawl C arranged on the stationary yoke is of S porality, as the front end of the member D approaches, an attraction force is exerted in between the poles of the both pawls to effect a locking. At this time, the inclined portion of the pawl produces a braking effect. It is noted that on the opposite end of the pawl C there is arranged a non-magnetic member J for limiting a range of rotation. Then, when to reset, the coil I is fed with a reversed current flow to magnetize its front end to S polarity, thereby the locking is automatically released as it is repelled by the S pole of the lock pawl C.

The device of FIG. 13 does not make use of a separate coil I as in FIG. 12, but arranges the blade drive coils 4, 4' to serve also as the coil I. In this case it is also possible to perform the operation in a similar manner to that described in connection with FIG. 12. It is noted that the stationary yoke 1a is provided with a projected portion L arranged to effect a balancing as in FIG. 11. thereby the locking operation is made to perform with a higher reliability. In the above embodiments, the coil I is formed as part of the blade drive coil so that the current supply to this coil may be controlled by the same circuit for the drive coil. Therefore, the circuit in the above-described first embodiment (FIG. 3) with the exclusion of the coils 6 and 6' may be used as the circuit of the devices of FIGS. 12 and 13.

Figure 14:
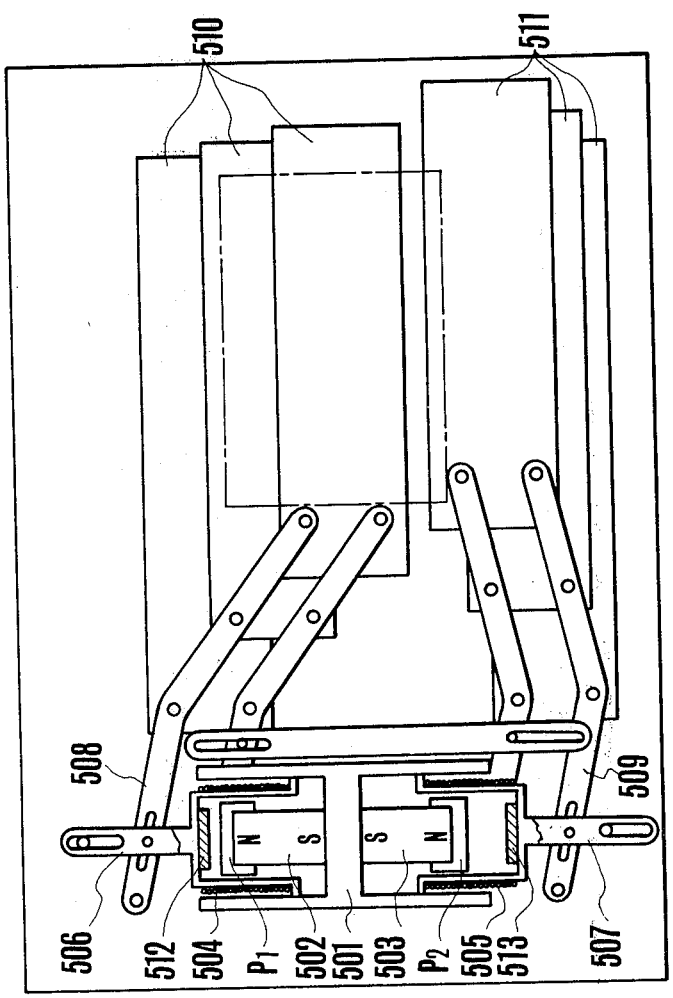
FIG. 14 is a plan view of a fifth embodiment of the electromagnetic control device according to the present invention associated with a slit exposure shutter.

FIG. 14 shows a fifth embodiment of an electromagnetically driven shutter according to the present invention. The illustrated embodiment makes use of a moving coil type device in driving the slit explosure shutter. In the figure, a permanent magnet carrying yoke 501 is configured to a tubular shape with a partition wall at the center of the longitudinal length thereof. Along the central axis of the tubular yoke 501 there are arranged permanent magnets 502 and 503. Arranged in a gap between each permanent magnet and the yoke is a movable coil 504, 505 turned on a respective bobbin. Motion of movable members 506 and 507 is transmitted through arms 508 and 509 to the leading and trailing blades 510 and 511 of the slit shutter, thereby the opening and closing operation is performed. In the device illustrated, in order to hold the movable coils 504 and 505 in the running down start ready position and the running down complete position, thin iron pieces 512 and 513 are arranged on the inside bottom surfaces of the movable coil bobbins respectively so that when the shutter assumes either one of the above-described positions, the corresponding one of the iron pieces is attracted by the permanent magnet to effect the holding. The other parts and the operation are similar to those in each of the above-described embodiments and therefore no more explanation is given here.

Figure 15:
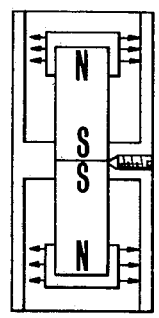
FIGS. 15 and 16 are plan views showing other two different examples of modification of the device of FIG. 14.
Figure 16:
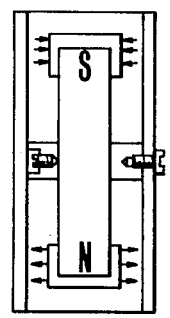

FIGS. 15 and 16 show other two different examples of the magnet arrangement in the electromagnetic drive device. In FIG. 15, the permanent magnets for the leading and trailing blades are combined to form a unit with its opposite ends of the same porality (in this instance, N) and with its center of S polarity forming a common magnetic path of the letter "H"-shaped yoke. In the device of FIG. 16, a single permanent magnet is used for the leading and trailing blades as is supported at the center of longitudinal length thereof by a non-magnetic member. With this, though the opposite ends of the magnet to the leading and trailing blade drive coils are different polarity, the structure can be simplified. It is noted that when the structure of FIG. 16 is used, it is necessary to differ the directions of flow of currents to the drive coils from each other.

Figure 17:
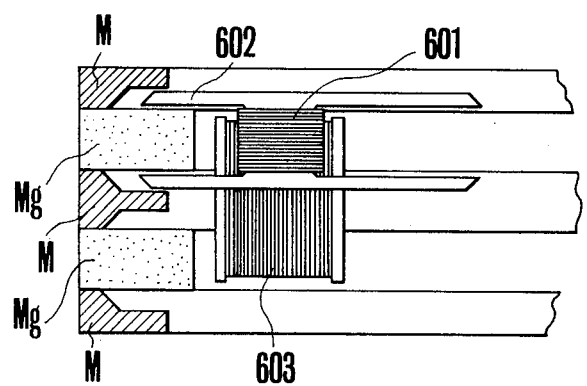
FIG. 17 is a fragmentary plan view of a sixth embodiment of the electromagnetic control device according to the present invention.

FIG. 17 is a fragmentary elevational view showing the construction of a drive portion in a sixth embodiment of the present invention. This embodiment makes use of an electromagnetic brake in place of the lock pawl of FIGS. 11 and 12. That is, a braking coil 601 is provided on the drive coil side upon energization thereof to produce a repulsive force due to the electromagnetic action in between the magnetic field of the yoke 602 and the projected portion M arranged in the stationary yoke. By this, the stoppage of the drive coil under the braking action is followed by the holding operation with the cut off of the current supply. That is, with the coil 601 de-energized, the yoke 602 is attracted in between the poles of the stationary magnet to hold the drive coil member 603. Upon current supply to the coil 601, the magnetic field produced in the yoke 602 repels the stationary yoke, thus effecting an electromagnetic braking action. It is noted that during the time when the shutter is running down, the current supply to the coil 601 may be continued, but after the termination of runing down movement, it is required to cut off the current supply so that the yoke 602 and the stationary magnetic pole are caused to attract each other, thus holding the shutter in the terminal end of movement thereof. It is further noted that the coil 601 may be fed with a current supply of instantaneous duration when it nears the terminal end of movement thereof.

FIG. 18 shows an example of the circuitry of the sixth embodiment of the present invention. This circuit is constructed as is derived from the circuit of FIG. 6(a) by removing the magnetic field cancelling coils 6 and 6' and instead by using coils 601 and 601' connected in series to the drive coils 4 and 4' respectively. The construction and arrangement of the other parts, and the manner in which the circuit operates are similar to those of the circuit of FIG. 6(a). Therefore, no more explanation is given here. It is noted that in the circuit of FIG. 18, the braking coils 601 and 601' are fed with current during the time when the shutter is running down, and the current supply is cut off at the same time when the current supply to the drive coil is cut off as the shutter reaches the terminal end of movement thereof.

The present invention has been described in connection with the many embodiments thereof. It should be further pointed out that in the electromagnetically driven shutter of the invention, in order to avoid unnecessary consumption of electrical power of the electromagnetic control device as possible as it can, the attractive force of the permanent magnet with the electromagnetic actuator or a mechanical coupling force related thereto is utilized in holding the shutter at the terminal end of movement of it. Even at this time, the consumption of electrical energy is limited to a minimum, while still permitting the holding of the blades of the shutter to be stabilized, thus a great advantage can be expected from the shutter arrangement using the electromagnetic drive source.

Although the illustrated embodiments are all adapted for use with the slit exposure shutter, it is to be understood that the drive control system of the invention is applicable not only to the slit exposure shutter but also to lens shutters with a slight modification. With the use of this system, it is made possible to achieve a large reduction in the consumption of electrical energy of the battery and a remarkable increase in the performance of the electromagnetically driven shutter.

What is claimed is:

1. An electromagnetically driven shutter comprising:
   at least one shutter blade;
      said blade being able to open and close an exposure light path;
   a permanent magnet;
      said magnet being fixedly mounted relative to the light path in the interior of a camera, and having a yoke of high magnetic permeability for forming a magnetic circuit;
   a movable coil member;
      said member being operatively connected to a portion of said shutter blade and displaceable in a magnetic field formed by said permanent magnet so that when current passes through said coil member in one direction, said member is displaced in a predetermined direction and the shutter blade passes across the exposure light path in response thereto;
   a movable magnetic member
      of a material of high magnetic permeability connected to said movable coil member, and movable in response to the displacement of the coil member, said movable magnetic member being holdable by attraction to a portion of the yoke of the permanent magnet at the terminal end of the displacement path of the movable coil member;
   electromagnetic release means;
      on at least one of the movable magnetic member and the yoke of the permanent magnet arranged upon current supply thereto to be magnetized in a direction to shut off the magnetic circuit formed between said permanent magnet and the movable magnetic member.

2. An electromagnetically driven shutter according to claim 1, wherein said yoke has a pawl portion having a high magnetic permeability and being pivotally mounted in relation to the yoke, said pawl portion being arranged so that a portion of the movable magnetic member engages said pawl member.

3. An electromagnetically driven shutter according to claim 2, wherein said yoke includes a limiting member for limiting a range of pivotal movement of the pawl member formed in a portion of said yoke.

4. An electromagnetically driven shutter according to claim 2, wherein said pawl member formed in a portion of the yoke and the movable magnetic member are magnetically attracted when engaging each other.

5. An electromagnetically driven shutter according to claim 4, wherein said pawl member in the yoke is pivotally mounted within the magnetic circuit of the permanent magnet and is positioned in a balanced state so as to assume a predetermined attitude in the magnetic circuit of the permanent magnet when said movable magnetic member is moved away from the pawl member.

6. An electromagnetically driven shutter according to claim 5, wherein the pawl member assumes a balanced state when receiving a bias force due to a spring.

7. An electromagnetically driven shutter according to claim 5, wherein the front end portion of the pawl member and the front end portion of the movable magnetic member are inclined to engage each other while sliding relative to each other.

8. An electromagnetically driven shutter according to claim 1, wherein said movable coil member is reciprocally displaceable, whereby when displaced to one direction, the shutter blade opens, and when displaced to the opposite direction, the shutter blade closes.

9. An electromagnetically driven shutter according to claim 8, wherein said holding means is actuated at the starting point, turning point and terminal point of the reciprocal displacement course of the moving coil member.

10. An electromagnetically driven shutter according to claim 1, further including detecting means for detecting whether or not the moving coil member is at the terminal end of displacement course thereof, and wherein after the shutter blade starts to terminate an exposure when the detecting means detects the fact that the coil member is not present at the terminal end thereof, the coil member is fed with current flowing in such a direction that the shutter is closed.

11. An electromagnetically driven shutter according to claim 1, wherein said shutter blade includes a spring balanced when the shutter blade lies substantially at a center of running down movement thereof for urging the shutter blade in the running direction at the start of an exposure, and exerting a braking force in the reverse direction to that in which the shutter blade runs down when at the terminal end of running down movement of the shutter blade.

12. An electromagnetically driven shutter according to claim 1, wherein said release means is supplied with a current so as to be magnetized in such a direction that movable magnetic member and the yoke repel each other near the starting point and near the terminal point of a run down movement of the shutter blade.

13. An electromagnetically driven shutter according to claim 1, wherein said movable conductor member consists of two movable coil portions adjacent each other capable of reciprocally moving along a common track, and said movable coil portions are operatively connected to the leading blade of the shutter and the trailing blade of the shutter respectively and arranged upon movement in the same direction in sequence to open and close the shutter.

14. An electromagnetically driven shutter according to claim 13, wherein said two movable coil portions each have a movable magnetic member displaceable in response to displacement of each portion, and the displacement of each movable coil portion is inhibited by the attraction or engagement of the opposite movable magnetic member with the permanent magnet yoke.

15. An electromagnetically driven shutter comprising:
at least one shutter blade for opening and closing an exposure light path;
a permanent magnet fixedly mounted relative to the exposure light path;
a movable conductor member operatively connected to said shutter blade and displaceable in the magnetic field formed by said permanent magnet so that when a current flows in a predetermined direction in said conductor member said conductor member is displaced in a predetermined direction and moves the shutter blade across the exposure light path;
a movable magnetic member connected to said movable conductor member for movement along a travel path in response to the displacement of the conductor member, and arranged to be held by the magnetic field of the permanent magnet at an end of the path of the movable conductor member.

16. An electromagnetically driven shutter according to claim 15, wherein:
said permanent magnet and the movable magnetic member form a magnetic circuit, and further comprising:
electromagnetic release means for disabling the magnetic circuit.

17. An electromagnetically driven shutter according to claim 15, wherein:
said permanent magnet has a yoke.

18. An electromagnetically driven shutter according to claim 17, wherein:
said yoke includes a pawl member having a high magnetic permeability and pivotally mounted in relation to the yoke, said pawl member being arranged so that a portion of the movable magnetic member engages said pawl member.

19. An electromagnetically driven shutter according to claim 18, further comprising:
a limiting member for limiting a range of pivotal movement of the pawl member formed in a portion of said yoke.

20. An electromagnetically driven shutter according to claim 18, wherein:
said pawl member of the yoke is pivotally mounted within the magnetic circuit of the permanent magnet and is positioned in a balanced state to assume a predetermined attitude in the magnetic circuit of the permanent magnet when said movable magnetic member is moved away from the pawl member.

21. An electromagnetically driven shutter according to claim 20, further comprising:
a spring for applying a bias force to said pawl member so that said pawl member assumes a balanced state in response to the bias force of the spring.

22. An electromagnetically driven shutter according to claim 20, wherein:
the pawl member and the magnetic member have front end portions, and the front end portion of the pawl member and the front end portion of the movable magnetic member are angular so that they can engage and slide against each other during relative movement of the magnetic member and the pawl member.

23. An electromagnetically driven shutter according to claim 15, wherein:
said movable conductor member is reciprocally displaceable so that when displaced to one direction, said shutter blade opens the exposure path, and when displaced to the opposite direction, said shutter blade closes the exposure light path.

24. An electromagnetically driven shutter according to claim 15, further including:
control means for detecting whether or not the moving conductor member is at an end of the travel path, and for closing a current path to feed current to the conductor member in a direction that closes the shutter when the means detects the fact that the conductor member is not present at the end of the travel path after the shutter blade starts to terminate an exposure.

25. An electromagnetically driven shutter according to claim 15, wherein:

said shutter blade executes a run down movement when opening or closing the exposure path and includes a spring balanced when the shutter blade lies at substantially the center of the run down movement for urging the shutter blade in the running direction at the start of an exposure, and exerting a braking force in the reverse direction to that in which the shutter blade runs down at the end of run down movement of the shutter blade.

26. An electromagnetically driven shutter according to claim 17, further comprising:

means for supplying said release means with a magnetizing current in a direction that causes the movable magnetic member and the yoke to repel each other near the starting point and near the end point of the run down movement of the shutter blade.

27. An electromagnetically driven shutter according to claim 15, further comprising:

a second shutter blade, one blade being a leading shutter blade, and the other being a trailing shutter blade;

said movable conductor member including two movable conductor portions adjacent each other capable of reciprocal displacement along a common track, and said movable conductor portions are operatively connected to the leading blade of the shutter and the trailing blade of the shutter respectively and arranged upon movement in the same direction in sequence to open and close the shutter.

28. An electromagnetically driven shutter according to claim 17, wherein:

said two movable conductor portions each have a movable magnetic member displaceable in response to displacement of each portion, the displacement of each movable conductor portion being inhibited by the attraction or engagement of the opposite movable magnetic member with the permanent magnet.

* * * * *